(12) United States Patent
Kaufmann et al.

(10) Patent No.: US 10,504,237 B2
(45) Date of Patent: Dec. 10, 2019

(54) METHOD FOR DETERMINING A VIEWING DIRECTION OF A PERSON

(71) Applicant: Bayerische Motoren Werke Aktiengesellschaft, Munich (DE)

(72) Inventors: Matthias Roland Kaufmann, Unterschleissheim (DE); Felix Schwarz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 64 days.

(21) Appl. No.: 15/625,521

(22) Filed: Jun. 16, 2017

(65) Prior Publication Data

US 2017/0287163 A1 Oct. 5, 2017

Related U.S. Application Data

(63) Continuation of application No. PCT/EP2015/075735, filed on Nov. 4, 2015.

(30) Foreign Application Priority Data

Dec. 17, 2014 (DE) .......................... 10 2014 226 185

(51) Int. Cl.
*G06T 7/33* (2017.01)
*G06T 7/73* (2017.01)
(Continued)

(52) U.S. Cl.
CPC .............. *G06T 7/73* (2017.01); *B60K 31/00* (2013.01); *B60K 37/06* (2013.01); *G06F 3/013* (2013.01);
(Continued)

(58) Field of Classification Search
CPC ...... A63F 13/327; A63F 13/213; A63F 13/25; A63F 13/32; A63F 13/335; A63F 13/655;
(Continued)

(56) References Cited

U.S. PATENT DOCUMENTS 6,675,075 B1 1/2004 Engelsberg et al.
2010/0020170 A1* 1/2010 Higgins-Luthman ....................... B60Q 1/1423
348/135
(Continued)

FOREIGN PATENT DOCUMENTS

DE 197 34 307 A1 2/1999
DE 199 51 001 A1 5/2001
(Continued)

OTHER PUBLICATIONS

Englished translated of DE19734307A1 (Feb. 11, 1999).*
(Continued)

*Primary Examiner* — Duy M Dang
(74) *Attorney, Agent, or Firm* — Crowell & Moring LLP

(57) ABSTRACT

A method for determining a viewing direction of a person, such as a driver in a motor vehicle, is provided. The method includes detecting a surface contour of a surface of an eye of the person, ascertaining a normal vector on the surface of the eye depending on the detected surface contour, and determining the viewing direction of the person depending on the normal vector.

7 Claims, 1 Drawing Sheet

(51) Int. Cl.
  *B60K 37/06* (2006.01)
  *G06F 3/01* (2006.01)
  *G06F 3/03* (2006.01)
  *G06T 7/50* (2017.01)
  *B60K 31/00* (2006.01)
  *B60Q 9/00* (2006.01)

(52) U.S. Cl.
  CPC .............. *G06F 3/0304* (2013.01); *G06T 7/50* (2017.01); *B60K 2370/149* (2019.05); *B60K 2370/21* (2019.05); *B60Q 9/00* (2013.01); *G06T 2207/30201* (2013.01); *G06T 2207/30268* (2013.01)

(58) Field of Classification Search
  CPC ......... A63F 13/00; G06T 7/55; G06T 3/0068; G06T 15/04; G06T 7/73; G06T 7/50; G06K 9/00228; B60K 31/00; B60K 37/06; G06F 3/013; G06F 3/0304
  See application file for complete search history.

(56) References Cited

U.S. PATENT DOCUMENTS

| | | | |
|---|---|---|---|
| 2012/0147328 A1* | 6/2012 | Yahav .................... | A61B 3/113 351/210 |
| 2013/0114850 A1 | 5/2013 | Publicover et al. | |
| 2014/0211995 A1 | 7/2014 | Model | |
| 2014/0226002 A1 | 8/2014 | Metzler et al. | |

FOREIGN PATENT DOCUMENTS

| | | |
|---|---|---|
| EP | 2 551 636 A1 | 1/2013 |
| EP | 2 583 619 A1 | 4/2013 |

OTHER PUBLICATIONS

International Search Report (PCT/ISA/210) issued in PCT Application No. PCT/EP2015/075735 dated Feb. 10, 2016 with English translation (five pages).

German-language Written Opinion (PCT/ISA/237) issued in PCT Application No. PCT/EP2015/075735 dated Feb. 10, 2016 (seven pages).

German Search Report issued in counterpart German Application No. 10 2014 226 185.6 dated Nov. 6, 2015 with partial English translation (12 pages).

Chennamma et al., "A Survey on Eye-Gaze Tracking Techniques", Indian Journal of Computer Science and Engineering (IJCSE), Oct.-Nov. 2013, pp. 388-393, vol. 4, No. 5.

* cited by examiner

METHOD FOR DETERMINING A VIEWING DIRECTION OF A PERSON

CROSS REFERENCE TO RELATED APPLICATIONS

This application is a continuation of PCT International Application No. PCT/EP2015/075735, filed Nov. 4, 2015, which claims priority under 35 U.S.C. § 119 from German Patent Application No. 10 2014 226 185.6, filed Dec. 17, 2014, the entire disclosures of which are herein expressly incorporated by reference.

BACKGROUND AND SUMMARY OF THE INVENTION

The invention relates to a method and device for detecting a viewing direction of a person, for example, of a driver in a motor vehicle.

Determining the viewing direction of a driver of a motor vehicle may be used for various driver assistance functions. For example, the display of the head-up display can be adapted or tracked as a function of the driver's viewing direction so that important information can be provided to the driver without any movements of the driver's eyes or head.

Moreover, warning devices can be provided which, as a result of analyzing the driver's viewing direction, detect when the driver, for an extended time period, looks away from a traffic situation lying ahead, for example, when the driver is looking at an instrument panel, or is searching for an object in the interior of the occupant compartment, etc.

German Patent Document DE 199 51 001 A1 discloses a device that allows information from various data sources is faded into the driver's field of view based on a driver's viewing direction.

Various methods are known for determining a driver's viewing direction. For example, by way of an infrared camera and an infrared light beam, by measuring the position of an infrared reflex point on the driver's pupil, the position of the iris can be detected and a viewing direction can be derived therefrom.

Another method uses an optical pattern detection in order to detect the boundary between the sclera and the iris of the eye and derive a viewing direction of the eye.

Determination methods are known that are based on the reflection of a light beam in the eye. For example, several reflection points in the eye can be captured at different optical interfaces. The alignment of the eye may thereby be detected and the viewing direction may be derived therefrom. This method is called the Purkinje Method.

Moreover, eye-tracking methods are known, in which with several cameras, a surface of the pupil of an eye as well as the normal vector standing thereon are calculated, which essentially corresponds to the viewing direction or from which the viewing direction can be derived.

The above-known methods use camera systems in the infrared range for detecting the viewing direction. In that regard, these methods are susceptible to interferences, for example in unfavorable backlight or changing light situations, as they may occur, for example, when driving through tunnels and on semi-shady roads. Moreover, the calibration of previous systems requires high expenditures, particularly if these systems operate via an infrared reflection point on the eye.

It is therefore an object of the present invention to provide an improved, less interference-sensitive determination of a viewing direction that avoids the disadvantages of the state of the art and is suitable for use in a motor vehicle.

According to one aspect of the disclosure, a method is provided for determining a viewing direction of a person, for example, a driver in a motor vehicle. The method includes acquiring a surface contour of a surface of the person's eye, detecting a normal vector on the surface of the eye as a function of the acquired surface contour, and determining the viewing direction of the person as a function of the normal vector.

For example, the above-described method may include three-dimensionally acquiring the visible portion of an eye and determining a normal vector from the determined surface structure of the pupil, from which a driver's viewing direction can be derived. As a result, a low-interference determination of the driver's viewing direction can be implemented since this method is not based on an acquisition of a reflection point in the eye. In addition, acquisition of the surface contour of the eye offers may increase, in connection with other viewing direction detection methods, the precision and availability of a viewing direction specification. Calibration expenditures can also be reduced by the combination with another viewing direction detection method.

In accordance with one embodiment of the disclosure, the acquisition of the surface contour of the surface of the person's eye may be carried out via a depth sensor, for example, a TOF camera or a LIDAR sensor.

By way of example, the normal vector is determined as a function of a pupil region determined from the surface contour and a curvature of the pupil region. For instance, the pupil region may be determined as an elevation on the surface of the eye. The elevation may project beyond a spherical surface of an eyeball of the eye.

By way of another example, the normal vector is detected at the center of the pupil region as a function of the curvature at the center of the pupil region.

In accordance with an embodiment of the disclosure, the acquisition of the surface contour of the surface of the eye may be carried out via another camera by first acquiring the position of the eye and acquiring the surface contour by the position of the eye.

In yet another example, the viewing direction is determined by applying one or two predefined correction angles or determined by calibration to the normal vector, which may be the optical visual axis, in which instance, the one or more correction angle(s) is/are determined by way of a calibration method.

In accordance with another embodiment, a viewing direction detection system is provided for determining a viewing direction of a person, for example, a driver in a motor vehicle. The viewing direction detection system may include a depth sensor for acquiring a surface contour of a surface of the person's eye, a control unit that determines a normal vector on the surface of the eye as a function of the acquired surface contour and/or determines the person's viewing direction as a function of the normal vector.

Moreover, the viewing direction detection system may include an additional device for determining the person's viewing direction, in which instance the control unit may be configured to make the viewing direction plausible and/or merging it by way of a further viewing direction acquired by the additional device.

According to a further aspect, a use of the viewing direction detection system in a motor vehicle is provided in order to detect a viewing direction of a driver of the motor vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
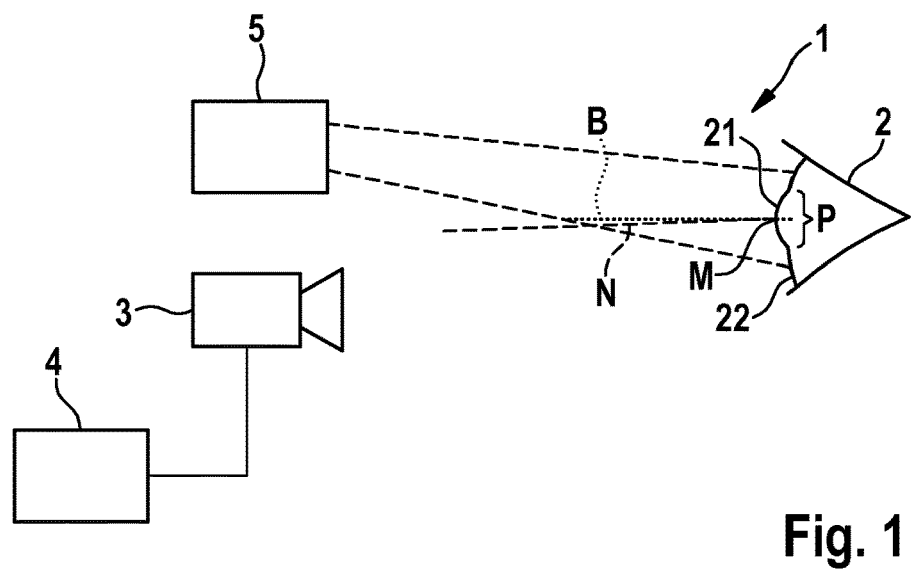
FIG. 1 illustrates a viewing direction detection system for use in a motor vehicle in accordance with one or more aspects of the disclosure.

FIG. 1 illustrates a viewing direction detection system 1, by which a viewing direction B of an eye 2 may be detected. The eye, for example, may be the eye of a driver of a motor vehicle and, by way of the detected viewing direction B, functions of the motor vehicle, such as driver assistance functions and warning functions may be activated.

The viewing direction detection system 1 may include a camera 3, which is directed at the driver's head. The camera 3 is connected to a control unit 4, in which instance, the position of at least one eye 2 of the driver may be detected by the control unit 4 ad known detection methods. As such, the detected eye position is used by a depth sensor 5 in order to record or to acquire a detailed three-dimensional surface contour of the eye 2, including the pupil of the eye 2. Alternatively, the camera 3 may be omitted, and the depth sensor 5 may be used for the detection of the position of the at least one eye 2.

The depth sensor 5 is a 3D camera system that is capable of recording a three-dimensional surface contour of an object.

An example of the depth sensor 5 is a TOF camera which, via the time-of-light (TOF) method, measures distances between an optical recording device and a surface of the object to be imaged. For this purpose, the object is illuminated by way of light pulses. For each pixel, the 3D camera measures the time between the emission of the light pulse and a reception of the light pulse reflected at the object in the 3D camera. The required time is directly proportional to the distance between the optical recording device and the object. For each pixel, the optical recording device supplies a distance to a point on the surface of the object to be acquired.

While such a TOF camera acquires several pixels for each emitted light pulse, laser scanning to scan each point and/or pixel by an individual light pulse acquires a 3D contour of the object by scanning the region to be acquired.

The depth sensor 5 is designed for transmitting contour data, which indicates a surface contour of the eye 2, to the control unit 4 and to determine the location of the pupil 21 by the detected surface contour of the eye 2. The pupil 21 can be detected as an elevation on the apple of the eye. The depth sensor 5 is provided such that the surface contour of the eye can be detected with sufficient precision.

By determining the location and the dimensions of the pupil 21 and its curvature, a normal vector on the pupil originating from the center of the pupil 21 may be determined as viewing direction B. The viewing direction B of the eye 2 has a fixed reference to this normal vector and will not deviate from the latter by not more than 5 degrees. Via the control unit 4, the viewing direction B may be correspondingly corrected, for example, by a calibration method.

Figure 2:
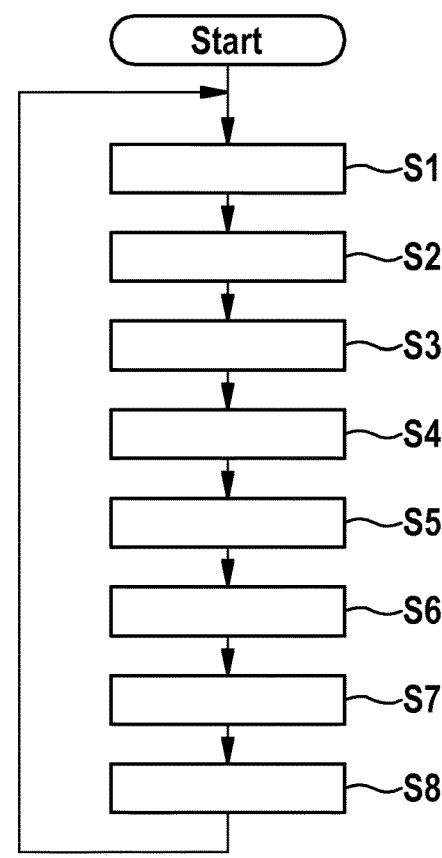
FIG. 2 illustrates a flow chart of a method for determining a viewing direction from an acquired three-dimensional pupil shape in accordance with one or more aspects of the disclosure.

FIG. 2 is a flow chart describing a method for detecting a viewing direction B in accordance with one or more aspects of the disclosure.

In step S1, via the camera 3, a head region of the driver's location in the motor vehicle is first recorded. The head region corresponds to the space which the driver's head will take up when the driver is sitting normally in the driver's seat. From the acquired image of the head region, in step S2, the position of the driver's head is detected by an image detection algorithm executed by the control unit 4, and the eye position is detected therefrom.

In step S3, the eye position is transmitted to the depth sensor 5, which aligns itself, and carries out a three-dimensional acquisition of the surface contour of the eye 2 from the eye position in step S4.

In step S5, the contour data, which three-dimensionally describe the surface contour of the eye 2, is transmitted to the control unit 4.

In step S6, the control unit determines the position of the pupil 21 of the eye 2. The pupil 21 corresponds to an elevation of the surface contour above a region, which projects above an essentially spherical surface of an apple 22 of the eye 2 with a curvature that differs therefrom. The pupil region P is an essentially round region on the surface of the apple 22 of the eye.

In step S7, a center M of the pupil region P is determined and a normal vector N on the center of the pupil 21 is determined by way of the circumferential line of the pupil region P or a curvature of the pupil 21 to be determined from the surface contour.

The normal vector N determined by the depth sensor 5 corresponds to an optical axis of the eye 2 and may correspond to a viewing direction B, or the viewing direction B may be detected from the normal vector N by the application of one or two (e.g., differently directed) correction angles of up to 5 degrees.

In step S8, the determined viewing direction B is corrected by a calibration process by adjusting the direction between the pupil 21 and an object to be observed. In a learning process, one or two correction angles oriented at a right angle to one another are determined, which indicate the deviation between the normal vector N and the viewing direction B of the eye 2.

As a result of the use of brief light pulses by the light sensor 5, the interference susceptibility during the acquisition of the surface contour of the eye is low, and a depth sensor is therefore suitable for use in a motor vehicle even in instances of rapidly changing light situations.

Since a conventional camera 3 is advantageous for the alignment of the depth sensor 5, the eye shape acquisition method may also be combined with other methods for determining the viewing direction based on a simple two-dimensional image capture by the camera 3. As a result, the acquired viewing direction may become more precise in that the viewing direction acquired by one method is made plausible by the viewing direction acquired by the additional method(s).

LIST OF REFERENCE NUMBERS

| 1 | Viewing direction acquisition system |
|---|---|
| 2 | Eye |

| | |
|---|---|
| 21 | Pupil |
| 22 | Apple of the eye |
| 3 | Camera |
| 4 | Control unit |
| 5 | Depth sensor |
| B | Viewing direction |
| N | Normal vector |
| P | Pupil region |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining a viewing direction of a person in a motor vehicle, the method comprising the acts of:
    recording, by a camera, a head region of the person in the motor vehicle;
    detecting a position of a head of the person based on said recording of the head region;
    detecting an eye position of the person based on the detected position of the head of the person;
    providing the detected eye position to a depth sensor;
    acquiring, by the depth sensor, a surface contour of a surface of an eye of the person based on the detected eye position;
    detecting a normal vector on the surface of the eye as a function of the acquired surface contour; and
    determining the viewing direction of the person as a function of the normal vector.

2. The method according to claim 1, wherein the normal vector is detected as a function of a pupil region detected from the surface contour and a curvature of the pupil region.

3. The method according to claim 2, wherein the pupil region is determined as an elevation on the surface of the eye and the pupil region projects over a spherical surface of an apple of the eye.

4. The method according to claim 2, wherein the normal vector at the center of the pupil region is detected as a function of the curvature at the center of the pupil region.

5. The method according to claim 1, wherein the viewing direction is determined by applying one or two correction angles to the normal vector, the one or more correction angles being determined by a calibration method.

6. The method according to claim 1, wherein the person is a driver of the motor vehicle.

7. The method according to claim 1, wherein the depth sensor is a TOF camera or a LIDAR sensor.

* * * * *